Sept. 13, 1932.  H. E. TAUTZ  1,877,705
SCROLL SAW
Filed Dec. 11, 1931
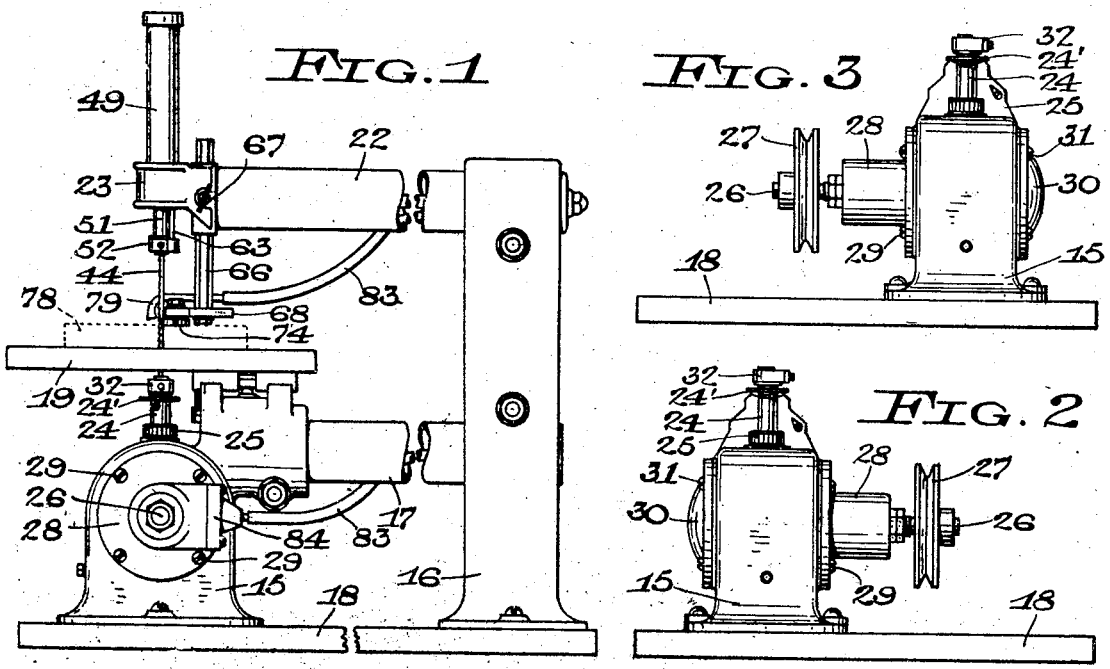
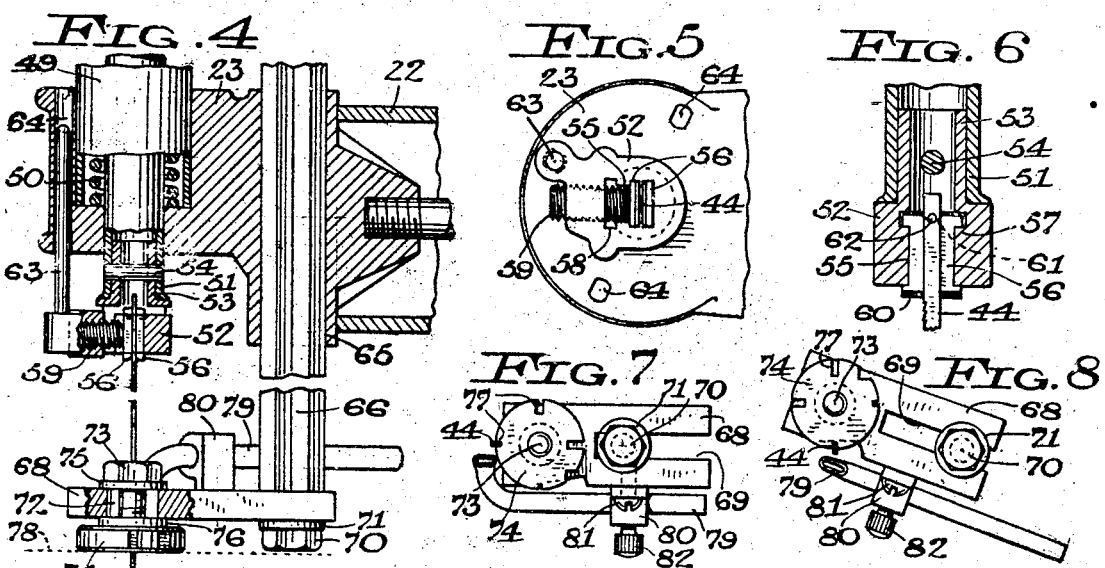
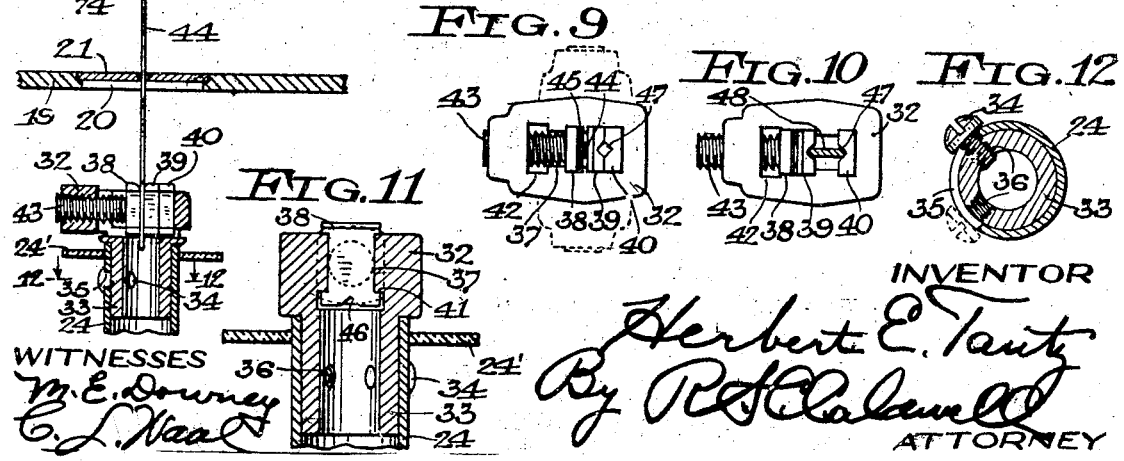
INVENTOR
Herbert E. Tautz
By R. S. Caldwell
ATTORNEY
WITNESSES
M. E. Downey
C. L. Naas Patented Sept. 13, 1932

1,877,705

UNITED STATES PATENT OFFICE

HERBERT E. TAUTZ, OF MILWAUKEE, WISCONSIN, ASSIGNOR TO DELTA MANUFACTURING COMPANY, OF MILWAUKEE, WISCONSIN, A CORPORATION OF WISCONSIN

SCROLL SAW

Application filed December 11, 1931. Serial No. 580,340.

The invention relates to scroll saws, and has for an object the provision of a scroll saw which can be operated with a variety of cutting members, such as pin blades, jewelers' blades, saber blades, machine files, and sanding devices, and in which the same chuck means are capable of clamping the various cutting members.

Another object of the invention is to provide a scroll saw having chuck means which can be placed in different positions to facilitate operation on the work piece.

A further object of the invention is to provide a scroll saw having blade guiding means capable of accommodating various blades and permitting placement of the blades in different angular cutting positions.

A further object of the invention is to provide a scroll saw having driving means which can be selectively placed on either side of the machine to accommodate the position of a driving motor or power shaft.

The invention further consists in the several features hereinafter set forth and more particularly defined by the annexed claims.

In the accompanying drawing, Fig. 1 is a side elevation of a scroll saw embodying the invention, the driving pulley thereof being omitted;

Fig. 2 is a front elevation of a drive housing, the drive shaft thereof being shown in one of its two positions;

Fig. 3 is a view similar to Fig. 2 but showing the drive shaft in its reversed position;

Fig. 4 is a fragmentary sectional elevation of the saw showing the upper and lower chuck means and the blade guiding means;

Fig. 5 is a bottom plan view of the upper blade chuck;

Fig. 6 is a sectional elevation of the upper blade chuck taken at right angles to the plane of Fig. 4;

Fig. 7 is a bottom plan view of the blade guiding means;

Fig. 8 is a view similar to Fig. 7 showing the blade guiding means in a different position;

Fig. 9 is a top plan view of the lower chuck as it appears when clamping a pin blade or jewelers' blade, two other angular positions of the chuck being indicated in dotted lines;

Fig. 10 is another top plan view of the chuck as it appears when clamping a saber blade;

Fig. 11 is a sectional elevation of the lower chuck taken at right angles to the plane of Fig. 4, and Fig. 12 is a transverse sectional view of the lower chuck taken along the line 12—12 of Fig. 4.

In this drawing, the numeral 15 designates a main drive housing which is fixedly secured to a rear column or standard 16 by means of a horizontally extending tubular arm 17, the housing 15 and column 16 being mounted on a suitable base 18.

A work table 19 is secured to the drive housing 15 and is mounted to tilt thereon about an axis lying substantially in the upper surface of the table. The work table 19 is provided with a circular rabbeted opening 20 within which removably fits a radially slotted insert disk 21 through which the cutting blades are passed.

A horizontally extending tubular cantilever arm 22 is secured to the upper end of the column or standard 16 in parallel upwardly spaced relation to the tubular arm 17, and at its free end carries an upper head 23 spaced above the table 19.

A vertical tubular plunger 24 projects upwardly from within the drive housing 15 and is slidably mounted in a bushing 25 secured in the housing. The tubular plunger 24 is reciprocated by any suitable mechanism within the drive housing and the mechanism is actuated by a horizontally extending drive shaft 26 carrying a V pulley 27. The shaft 26 is journalled in a flanged bearing member 28 secured by screws 29 to one side of the housing, the other side of the housing being closed by a flanged cover 30 secured to the housing by screws 31. The flanged portions of the bearing 28 and cover 30 are the same so that the bearing and cover may be interchanged, as seen in Fig. 3, for placing the drive shaft on the opposite side of the housing and thus accommodating different positions of the driving motor or power shaft (not shown).

A chuck body 32 is provided with a tubular shank 33 which rotatably fits within the upper end of the reciprocatory tubular plunger 24. The shank 33 is secured to the plunger by a screw 34 passing through a horizontal slot 35 in the plunger, and selectively threaded into one or the other of a pair of openings 36 formed in the shank. The slot 35 is of such length as to permit a quarter turn of the chuck body when the screw is in one of the openings 36, and another quarter turn when the screw is threaded into the other opening, thus permitting the chuck body to occupy any one of the three positions shown in Fig. 9, two of which are indicated in dotted lines. The screw 34 is tightened to clamp the chuck body in its selected position on the plunger. The removal of the screw 34 permits the chuck to be removed for cleaning. A fiber dust washer 24' is carried on the upper portion of the plunger 24.

The chuck body 32 is provided with an upwardly opening slot 37 slidably receiving therein the reduced intermediate portions of a plurality of chuck jaws 38, 39, and 40. The laterally projecting upper ends of the chuck jaws are engageable with the upper face of the chuck body, and the laterally projecting lower ends of the chuck jaws are engageable with shoulders or ways 41 within the chuck body. The slot 37 has an enlarged end portion 42 permitting insertion and removal of the chuck jaws. A horizontally extending socket head set screw 43 is threaded in the chuck body to place clamping pressure on the chuck jaws.

The chuck jaws 38 and 39 are adapted to clamp therebetween the lower end portion of a saw blade 44, here indicated to be a pin blade, the blade being arranged to extend along the vertical axis of the chuck. The jaws 38 and 39 are chamfered at 45 to facilitate the entrance of the blade and are provided with V notches 46 at their lower edges to receive the cross pin of the blade and to center the blade along the axis of the chuck body. When jewelers' blades are used they are also clamped between the jaws 38 and 39.

The chuck jaws 39 and 40 are provided with vertical complementary notches 47 for receiving therein the opposite edges of a saber blade 48, as seen in Fig. 10. The notched jaws 39 and 40 are also adapted to receive other cutting elements, such as machine files or sanding attachments.

The head 23 has secured therein an upstanding tube 49, which houses the usual coiled spring 50 for applying tension to the upper end of the blade. A tubular plunger 51 is slidably and rotatably mounted in the head 23 and is urged upwardly by the spring 50, the plungers 51 and 24 being in vertical axial alignment. An upper chuck body 52 is provided with a reduced tubular shank 53 fitting within the plunger 51 and secured thereto by a cross pin 54.

The chuck body 52 is provided with a downwardly opening slot 55 slidably receiving therein the reduced intermediate portions of a pair of chuck jaws 56. The laterally projecting lower ends of the chuck jaws are engageable with the lower face of the chuck body, and the laterally projecting upper ends of the chuck jaws are engageable with shoulders or ways 57 within the chuck body. The slot 55 has an enlarged end portion 58 permitting insertion and removal of the chuck jaws. A horizontally extending socket head set screw 59 is threaded in the chuck body to place clamping pressure on the chuck jaws.

The chuck jaws 56 are adapted to clamp therebetween the upper end portion of the saw blade 44, the blade being arranged to extend along the vertical axis of the chuck. The jaws 56 are chamfered at 60 to facilitate the entrance of the blade and are provided with V notches 61 at their upper edges to receive the cross pin 62 of the blade. When jewelers' blades are used, they are also clamped between these jaws. When rigid cutting elements are used, such as saber blades or machine files, the upper chuck is not used.

The upper chuck body 52 carries thereon an upstanding pin 63 which is adapted to enter any one of three vertical openings 64 formed in the head 23, thus permitting the chuck body 52 to be held in any one of three angular positions to correspond with the position of the lower chuck body 32. To change the angular position of the chuck body 52, the body is pulled downwardly against the action of the spring 50 to release the pin 63 from the head 23.

The head 23 is provided with a vertically extending opening 65 of polygonal cross section through which slidably fits a polygonal bar or post 66 releasably retained in adjusted position by a wing screw 67 threaded into the head. A plate 68 is provided with a longitudinally extending slot 69 at one end, and has its slotted end bearing against the lower end of the post 66 to which it is secured by a screw 70 threaded axially into the post and bearing against a clamping washer 71 engaging the lower face of the plate. By means of this connection, the plate 68 may be adjusted longitudinally as well as angularly. The free end portion of the plate 68 is provided with a vertical bore 72 therethrough loosely receiving therein a screw 73 which is threaded from above into a disk-like blade guide 74, there being clamping washers 75 and 76 surrounding the screw 73 and engaging the opposite faces of the plate. As best seen in Figs. 7 and 8, the blade guide 74 is provided at its periphery with a number of blade guiding slots or recesses 77 of various widths and depths for accommodating different sizes and shapes of blades. The blade guide 74 is rotatable for selectively presenting the various slots to the blade and to permit the blade to be shifted in its angular position, two different positions of the blade being indicated in Figs. 7 and 8. The loose fit of the screw 73 in the bore 72 permits the blade guide to be properly fitted to the blade. The blade guide 74 has a flat lower surface adapted to lie close to the upper surface of a work piece 78, the blade guide thus forming a hold-down for the work piece to prevent the work piece from rising when the blade is on its upward stroke.

For removing the sawdust from the region of the work piece being cut, an air nozzle 79 is provided and is carried on a bracket 80 secured to the guide plate 68 by a screw 81. The nozzle 79 is longitudinally and rotatably adjustable in the bracket 80 and is clamped thereto by a screw 82. The bracket 80 may also be adjusted angularly about its attaching screw. A flexible air hose 83 is connected to the nozzle 79 and passes through the upper tubular arm 22, through the column or standard 16, and through the lower tubular arm 17, the lower end of the tube being connected to an air pump 84 which is mounted on the bearing bracket 28.

In operation, the saw blade is reciprocated by the lower plunger 24 to which it is releasably secured by the lower chuck, the blade being held under tension by the axially movable spring-pressed upper chuck. The blade is guided against lateral movement by the blade guide 74 which also takes the back thrust of the blade and forms a hold-down for the work. For convenience to the operator, the blade can be presented in any one of three angular positions by changing the positions of the chucks. When using saber blades, machine files, and sanding devices, the upper chuck is not used, and the slotted insert 21 may be removed. While provision is made in the chucks for accommodating the cross pins of the pin blades, it is not necessary to rely on these pins for holding action, since the clamping action on the jaws is sufficient.

What I claim as new and desire to secure by Letters Patent is:

1. In a scroll saw, the combination of a reciprocatory plunger having a cross slot, a blade chuck rotatably fitting in said plunger and having a pair of threaded openings registrable with said slot, and a screw passing through said slot and releasably threaded into one or the other of said openings to permit an extended rotary adjustment of said blade chuck.

2. In a scroll saw, the combination of a support, a reciprocatory plunger slidably and rotatably mounted in said support, a blade chuck on said plunger, there being a plurality of openings in said support, and a pin secured to said blade chuck and selectively slidably fitting in said openings for presenting the blade chuck in different angular positions.

3. In a scroll saw, the combination of a support, a reciprocatory plunger slidably and rotatably mounted in said support, and a blade chuck on said plunger, said support and plunger having relatively slidable interfitting parts engageable in any one of a plurality of angular positions to prevent the rotation of said plunger in its normal range of movement, said interfitting parts being separable by an extended movement of said plunger to permit rotation of said plunger to different angular positions.

4. A chuck for holding saw blades and the like, comprising a body, a cylindrical shank attached to said body and serving as a pivot about which the body may be turned, a stationary member shaped to receive said shank and permit rotation thereof, a positioning lug secured to the body and projecting therefrom, the stationary member being provided with a suitable number of apertures each adapted to receive said lug and thus position the body in a definite direction with respect to the stationary member, said body having guide means therein, a plurality of flat jaws guided by said means and an element cooperating with said body and said jaws to force the jaws against one another.

5. A chuck for holding saw blades and the like, comprising a body, a cylindrical shank attached to said body and serving as a pivot about which the body may be turned, a stationary member shaped to receive said shank and permit rotation thereof, a positioning lug secured to the body and projecting therefrom, the stationary member being provided with means cooperating with said lug to position the body in a definite direction with respect to the stationary member, said body having guide means therein, a plurality of flat jaws guided by said means and an element cooperating with said body and said jaws to force the jaws against one another.

6. A chuck for holding saw blades and the like, comprising a body, a cylindrical shank attached to said body and serving as a pivot about which the body may be turned, a stationary member shaped to receive said shank and permit rotation thereof, cooperating means on the body and on the stationary member serving to position the body in a definite direction with respect to the stationary member, said body having guide means therein, a plurality of flat jaws guided by said means and an element cooperating with said body and said jaws to force the jaws against one another.

7. In a scroll saw, the combination of a frame, a reciprocatory lower plunger mounted on said frame, a lower blade chuck rotatably mounted on said plunger, means for adjusting the angular position of said lower chuck, a reciprocatory upper plunger slidably and rotatably mounted in said frame above said first-named plunger, and an upper blade chuck on said upper plunger, said upper and lower blade chucks being adapted to receive the opposite end portions of a cutting blade, said frame and upper plunger having relatively slidably interfitting parts engageable in any one of a plurality of angular positions to permit the rotation of said plunger in its normal range of movement, said interfitting parts being separable by an extended movement of said upper plunger to permit rotation of said plunger to different angular positions.

In testimony whereof, I affix my signature.

HERBERT E. TAUTZ.